United States Patent [19]

Sano et al.

[11] Patent Number: 4,899,297

[45] Date of Patent: Feb. 6, 1990

[54] METHOD AND APPARATUS FOR AUTOMATICALLY TESTING TEMPERATURE MEASURING DEVICES

[75] Inventors: Yoshikazu Sano; Susumu Kobayashi; Kiyoshi Endo, all of Fujinomiya, Japan

[73] Assignee: Terumo Kabushiki Kaisha, Tokyo, Japan

[21] Appl. No.: 177,492

[22] Filed: Apr. 4, 1988

[30] Foreign Application Priority Data

Apr. 8, 1987 [JP] Japan .................. 62-84526

[51] Int. Cl.$^4$ ............................................. G06F 15/20
[52] U.S. Cl. .................. 364/557; 364/571.03; 374/1
[58] Field of Search ............ 364/550, 557, 571.03, 364/552; 73/1 R; 374/1, 45, 129, 117, 121, 170, 163

[56] References Cited

U.S. PATENT DOCUMENTS

| | | | |
|---|---|---|---|
| 4,246,641 | 1/1981 | Babil et al. | 374/1 |
| 4,293,916 | 10/1981 | Del Ret al. | 364/557 |
| 4,513,616 | 4/1985 | Bezard et al. | 364/571.03 |
| 4,532,601 | 7/1985 | Lenderking et al. | 364/557 |
| 4,571,689 | 2/1986 | Hildebrand et al. | 364/550 |
| 4,639,882 | 1/1987 | Keats | 364/557 |
| 4,653,507 | 3/1987 | Laudadio | 374/45 |

Primary Examiner—P. S. Lall
Assistant Examiner—Christopher L. Makay
Attorney, Agent, or Firm—Frishauf, Holtz, Goodman & Woodward

[57] ABSTRACT

In a method and apparatus for testing a number of functions of a temperature measuring device, a temperature measuring portion is subjected to a predetermined temperature, and information outputted by the device is read optically or acoustically. The application of various temperatures and the reading of the outputted information are controlled sequentially in dependence upon the types of functions to be tested, and the read information is compared with predetermined information to determine whether each function passes or fails the test. A thermal equilibrium temperature measurement function of the device is tested by heating the temperature measuring portion to thermal equilibrium. Power is then reintroduced to the device and the initial display of the device is tested to determine if all segments of the display light. Next, the device is cooled to a predetermined temperature, reheating is started and information displayed upon elapse of a first predetermined time period is read to check the automatic measurement start function of the device. Information displayed upon elapse of a second predetermined time period is read to check a predicted equilibrium temperature measurement function. An acoustic warning alarm function is tested by subjecting the device to a high temperature.

7 Claims, 9 Drawing Sheets

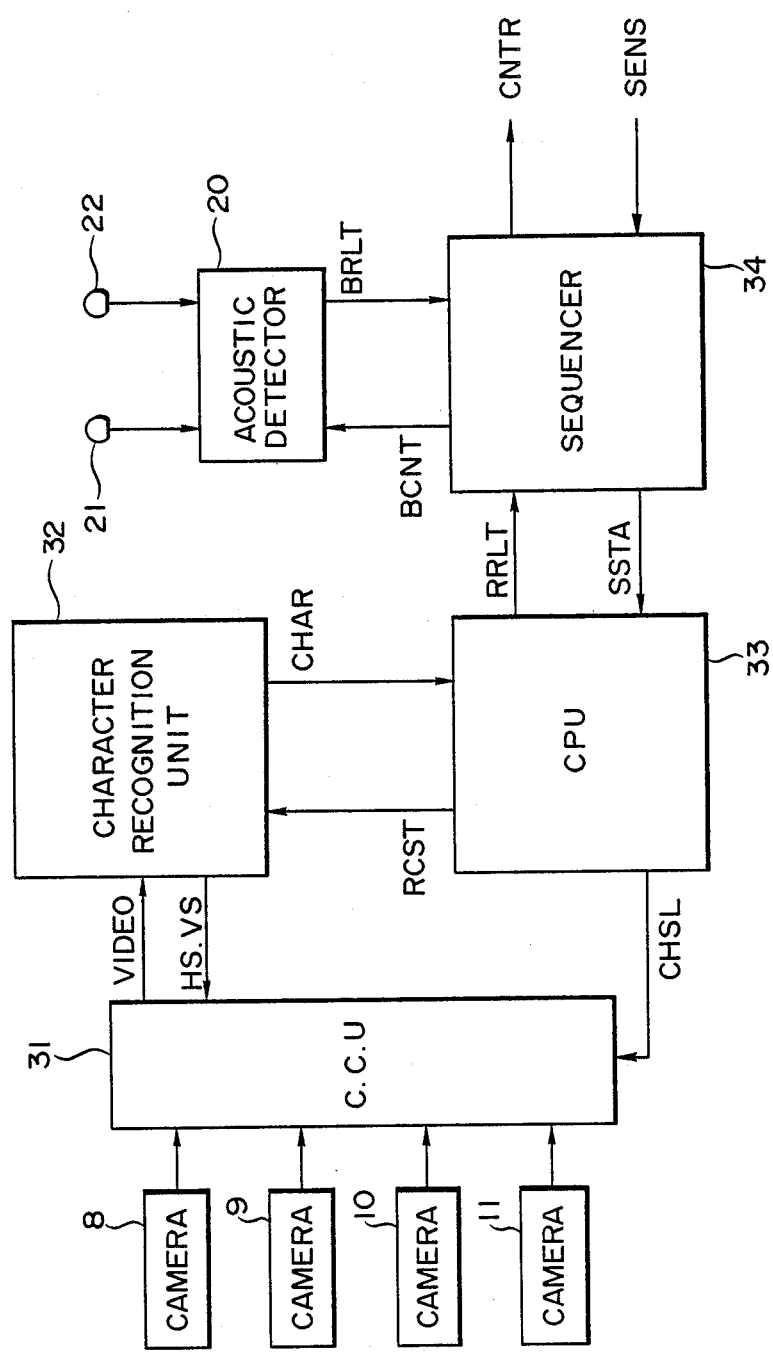
F I G. 2

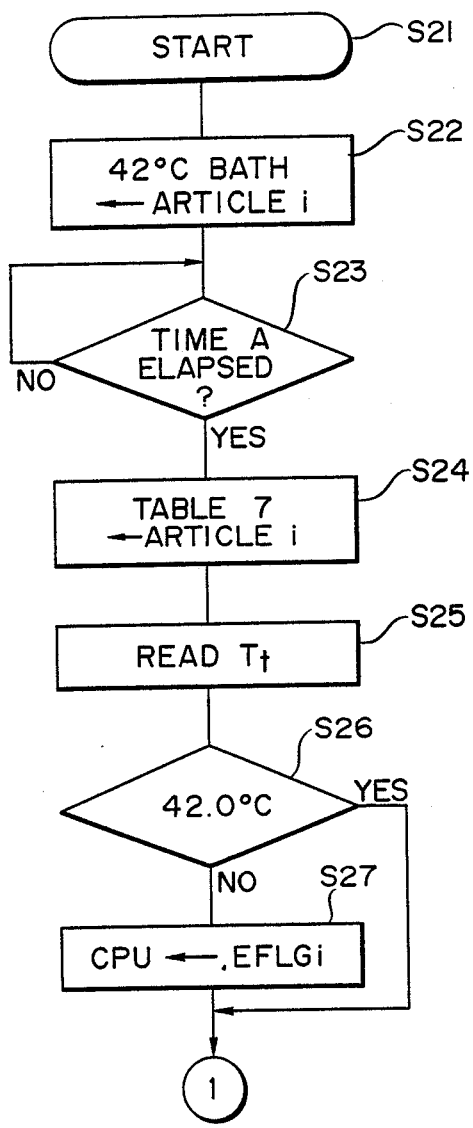
F I G. 4(A)
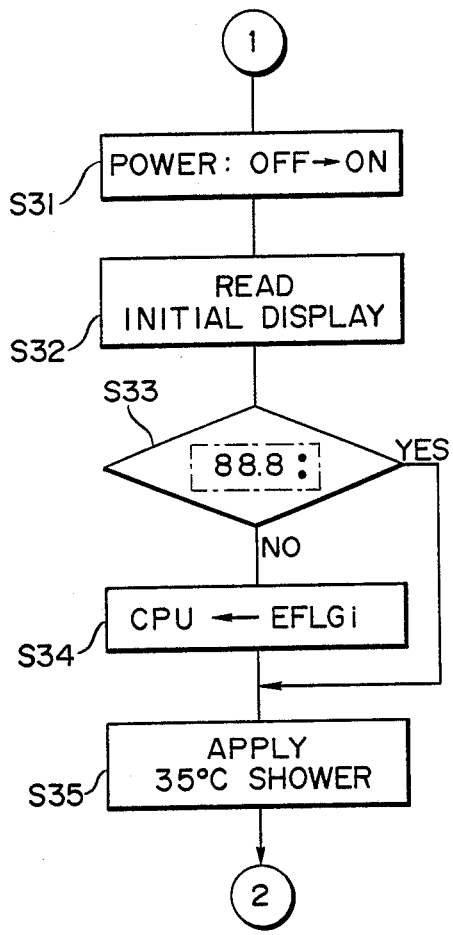
F I G. 4(B)

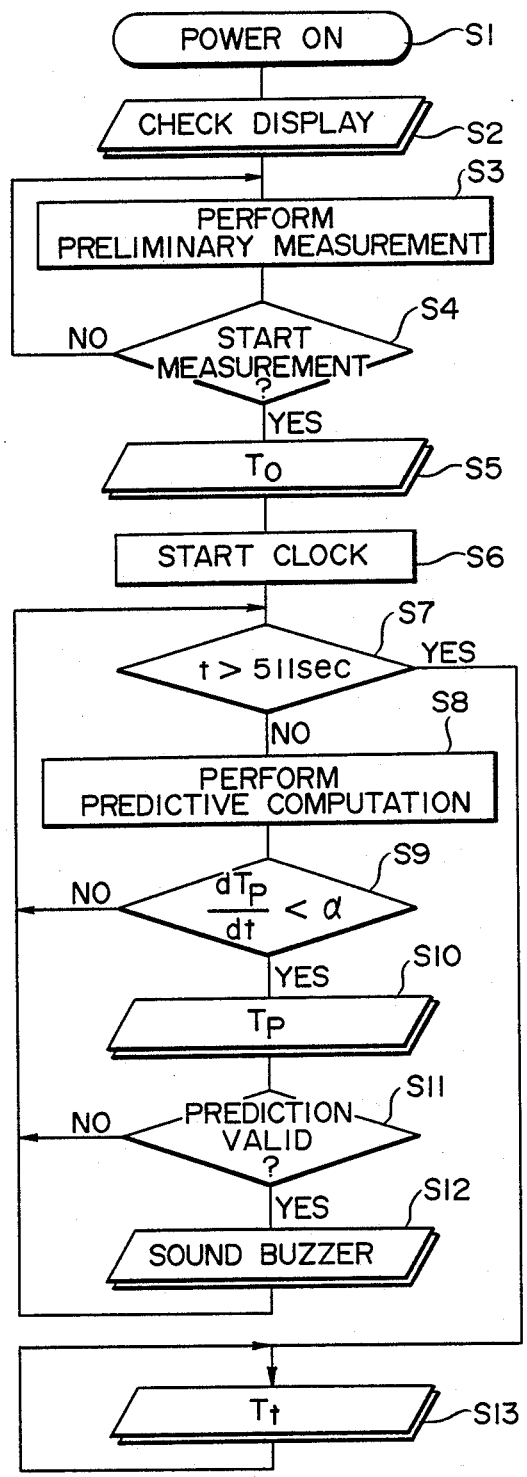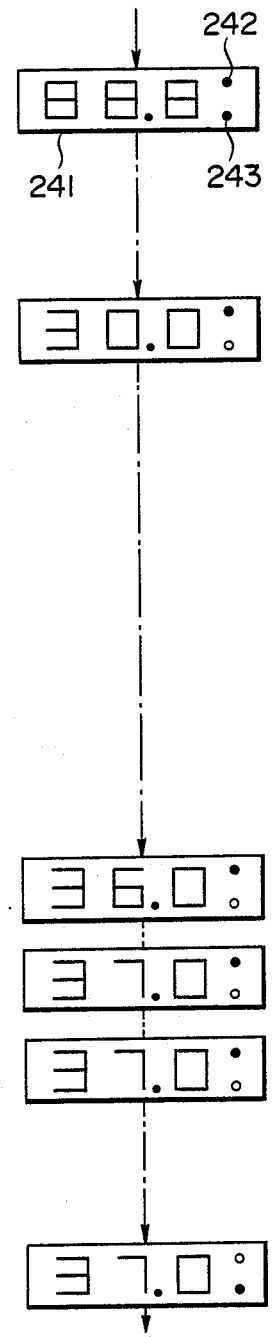
F I G. 7(A)　　F I G. 7(B)

METHOD AND APPARATUS FOR AUTOMATICALLY TESTING TEMPERATURE MEASURING DEVICES

BACKGROUND OF THE INVENTION

This invention relates to a method and apparatus for automatically testing temperature measuring devices. More particularly, the invention relates to method and apparatus for automatically testing a temperature measuring device, in an efficient manner, to determine whether a plurality of functions of the device are operating acceptably, these functions including a full display function, an automatic measurement starting function, a predicted equilibrium temperature measurement function, a thermal equilibrium temperature measurement function and an acoustic alarm function.

Separate apparatus are available for testing single functions of temperature measuring devices, such as by reading the liquid crystal display of the device or detecting the sound of a buzzer. However, in view of the progress that has been made in applying electronics to temperature measuring devices and in increasing the number of their functions, it is now necessary to test a variety of functions at the factory in such steps as manufactured article inspection, conveyance and discharge of rejects. A great amount of time and labor are required when these tests are performed individually. Another problem is that relying upon human intervention in the testing process results in a wide fluctuation in testing time and does not provide uniform testing accuracy.

SUMMARY OF THE INVENTION

An object of the present invention is to automate the testing of a plurality of functions of a temperature measuring device in order to alleviate testing labor, shorten testing time and improve and stabilize testing accuracy.

Another object of the present invention is to efficiently automate the testing of a plurality of functions of a temperature measuring device in dependence upon the type of function, thereby greatly improving testing efficiency.

According to the present invention, the foregoing objects are attained by providing a method of automatically testing a temperature measuring device, which comprises the steps of: heating at least a temperature measuring portion of the temperature measuring device until thermal equilibrium of a predetermined temperature is attained; testing a thermal equilibrium temperature measurement function of the device by reading display information from the device after the heating step and comparing this display information with information indicative of the predetermined temperature; cutting off power to the device after the testing step and then reintroducing power to the device; and testing a full display function of the device by reading the display information from the device after the reintroduction of power and comparing this display information with predetermined information.

In another aspect of the invention, the foregoing objects are attained by providing a method of automatically testing a temperature measuring device, which comprises the steps of: heating at least a temperature measuring portion of the temperature measuring device at a predetermined temperature; testing an automatic measurement starting function of the device by reading display information from the device upon elapse of a first predetermined time after the start of heating; and testing a predicted equilibrium temperature measurement function of the device by reading display information from the device upon elapse of a second predetermined time after the start of heating and comparing the display information with the predetermined temperature.

In still another aspect of the invention, the foregoing objects are attained by providing a method of automatically testing a temperature measuring device, which comprises the steps of: heating at least a temperature measuring portion of the temperature measuring device until a thermal equilibrium of a first predetermined temperature is attained; testing a thermal equilibrium temperature measurement function of the device by reading display information from the device at said thermal equilibrium and comparing this display information with information indicative of the first predetermined temperature; holding at least the temperature measuring portion at a second predetermined temperature after the testing step; heating the temperature measuring portion to a third predetermined temperature after the holding step; testing an automatic measurement starting function of the device by reading display information from the device upon elapse of a first predetermined time after the start of heating to said third predetermined temperature; and testing a predicted equilibrium temperature measurement function of the device by reading display information from the device upon elapse of a second predetermined time after the start of heating to said third predetermined temperature and comparing the display information with the third predetermined temperature.

According to the present invention, the foregoing objects are attained by providing an apparatus for automatically testing a temperature measuring device, which comprises: warm bath means for applying a predetermined temperature to at least a temperature measuring portion of the temperature measuring device; optical reading means for optically reading display information from the device; decision means for determining whether a function of the device is acceptable by comparing the display information read by the optical reading means with predetermined information; and control means for sequentially controlling one or more of the warm bath means, the optical reading means and the decision means in dependence upon a plurality of functions of the device that are to be tested.

In a preferred embodiment of the invention, the apparatus includes means for remotely reintroducing power to a temperature measuring device in a testing step.

In another preferred embodiment of the invention, the apparatus includes acoustic reading means for reading acoustic output information from the temperature measuring device, and decision means for determining whether the function of the device is acceptable by comparing the acoustic output information read by the acoustic reading means with predetermined information.

In a further preferred embodiment of the invention, the control means controls one or more of the warm bath means, reading means and decision means in dependence upon any two or more functions among the full display function, automatic measurement starting function, predicted equilibrium temperature measurement function, thermal equilibrium temperature measurement function and acoustic alarm function of the temperature measuring device.

In the above arrangement, the warm bath means applies a predetermined temperature to at least the temperature measuring portion of a temperature measuring device. The optical reading means optically reads display information from the device. The decision means determines whether the function of the device is acceptable by comparing the information read by the optical reading means with predetermined information. The control means sequentially controls one or more of the warm bath means, reading means and decision means in dependence upon the plurality of functions of the device that are to be tested.

In such case, it is preferred that power be remotely reintroduced, whenever necessary, to the temperature measuring device in a testing step.

Further, it is preferred that the acoustic reading means read acoustic output information from the temperature measuring device, and that the decision means determine whether the function of the device is acceptable by comparing the information read by the acoustic reading means and predetermined information.

Further, it is preferred that the control means control one or more of the warm bath means, reading means and decision means in dependence upon any two or more functions among the full display function, automatic measurement starting function, predictive equilibrium temperature measurement function, thermal equilibrium temperature measurement function and acoustic alarm function of the temperature measuring device.

More specifically, at least a temperature measuring portion of the temperature measuring device is heated until thermal equilibrium of a predetermined temperature is attained. A thermal equilibrium temperature measurement function of the device is tested by reading display information from the device after the aforementioned heating and comparing this display information with information indicative of the predetermined temperature. Next, power supplied to the device is cut off after the aforementioned test, power is reintroduced to the device, and a full display function of the device is tested by reading the display information from the device after the reintroduction of power and comparing this display information with predetermined information.

In another arrangement, at least a temperature measuring portion of the temperature measuring device is heated at a predetermined temperature. An automatic measurement starting function of the device is tested by reading display information from the device upon elapse of a first predetermined time after the start of heating, and a predicted equilibrium temperature measurement function of the device is tested by reading display information from the device upon elapse of a second predetermined time after the start of heating and comparing the display information with the predetermined temperature.

In still another arrangement, at least a temperature measuring portion of the temperature measuring device is heated until thermal equilibrium of a first predetermined temperature is attained. A thermal equilibrium temperature measurement function of the device is tested by reading display information from the device at thermal equilibrium and comparing this display information with information indicative of the first predetermined temperature. Next, at least the temperature measuring portion is maintained at a second predetermined temperature after the aforementioned test. This is followed by heating the temperature measuring portion to a third predetermined temperature, testing an automatic measurement starting function of the device by reading display information from the device upon elapse of a first predetermined time after the start of heating, and testing a predicted equilibrium temperature measurement function of the device by reading display information from the device upon elapse of a second predetermined time after the start of heating and comparing the display information with the third predetermined temperature.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing a control section for controlling the components of the automatic testing system of FIG. 1;

FIGS. 4(A) through (D) are flowcharts for describing an embodiment of automatic testing processing in connection with an indexing table 7;

FIG. 7(A) is a flowchart illustrating temperature measurement processing executed within the electronic clinical thermometer of FIG. 6(A); and FIG. 7(B) is a view showing the transition of a display readout that accompanies the temperature measurement processing of FIG. 7(A).

DESCRIPTION OF THE PREFERRED EMBODIMENT

An embodiment of the present invention will now be described in detail with reference to the accompanying drawings.

Figure 1:
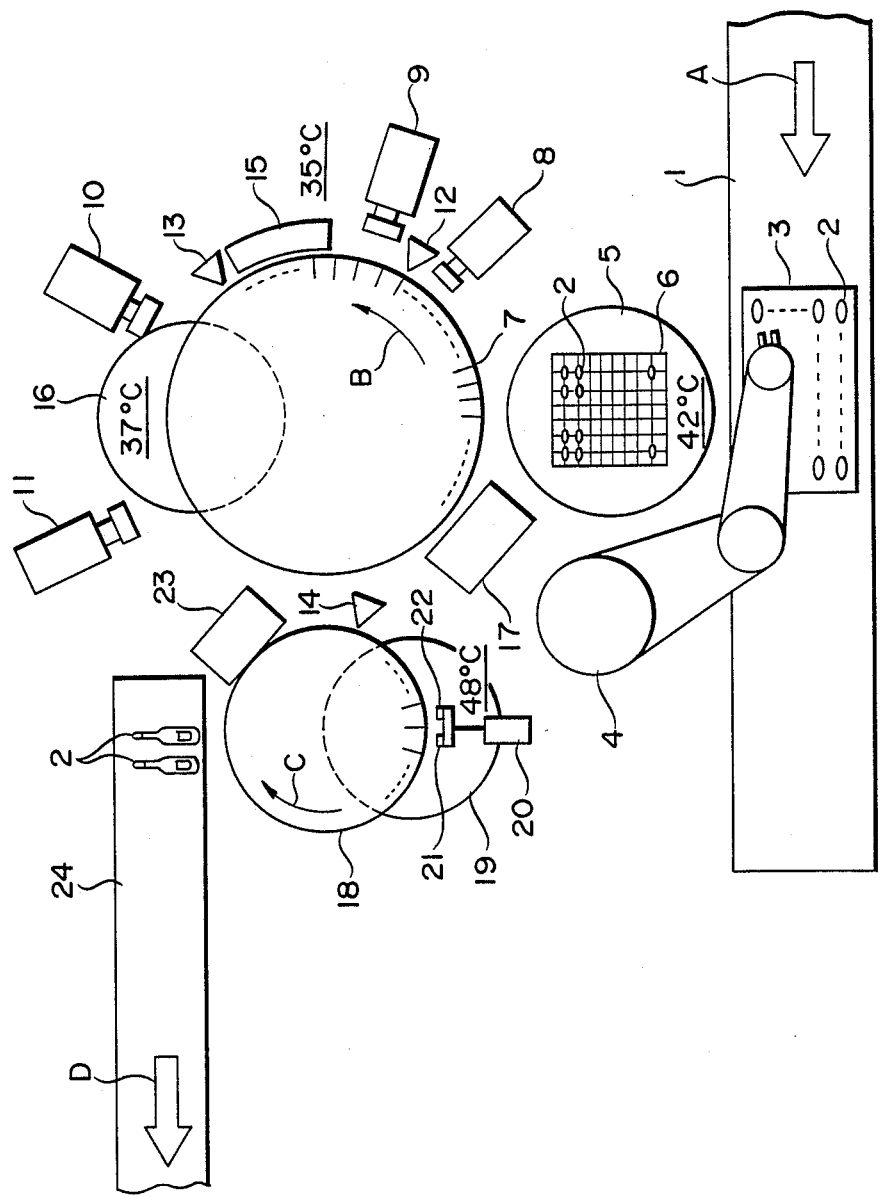
FIG. 1 is a block diagram showing an automatic testing system embodying the present invention.

FIG. 1 is a block diagram illustrating an embodiment of an automatic testing system according to the present invention. Numeral 2 denotes an article (e.g. a predicting-type electronic clinical thermometer) that is to undergo automatic testing. Numeral 3 denotes an article pallet accommodating a number of the articles 2 in a correct array so that the articles can be handed by a robot 4. The robot 4 handles the articles 2. Numeral 1 denotes a conveyor for conveying the article pallet 3 in the direction of an arrow A. Numeral 5 denotes a first constant temperature water bath, though the invention is not limited to a water bath. The bath 5 is for applying a first predetermined temperature (42.0° C. in the present embodiment) to the articles 2. Numeral 6 denotes a jig for holding the articles 2 in such a manner that each article 2 in the constant temperature bath 5 is subjected to a uniform temperature environment. Numeral 7 designates a first indexing table along the circumference of which the articles are placed equidistantly for being successively carried by the table in the direction of an arrow B. A detecting circuit, not shown, generates an index pulse whenever the circumference of the indexing table 7 travels a predetermined distance. Numeral 8 denotes a first video camera for reading an equilibrium temperature value $T_t$ displayed by each article 2 during the conveyance thereof on the indexing table 7. Numeral 12 denotes a first magnet for remotely reintroducing power (OFF→ON) to the power supply circuit of article 2 during the conveyance thereof on the indexing table 7. Numeral 9 designates a second video camera for reading an initial display of the article 2 after the article power is reintroduced thereto. In the present embodiment, the initial display is one in which all segments of the liquid crystal display are lit. Numeral 15 is a warm water shower, though the invention is not limited to a water shower, provided for the next testing step and is adapted to preheat the articles 2 at a predetermined temperature (about 35.0° C. in the present embodiment) for the purpose of uniformalizing and stabilizing the initial conditions of the articles 2 during their conveyance by the indexing table 7. A second magnet 13 remotely reintroduces power to the power supply circuit of article 2 during the conveyance thereof on the indexing table 7. A third video camera 10 reads an auto-start state display indicated by the article 2 during its conveyance on the indexing table 7. A second constant temperature water bath 16, though the invention is not limited to a water bath, applies a second predetermined temperature (37.0° C. in the present embodiment) to the article 2 during its conveyance. A fourth video camera 11 reads a predicted temperature value $T_p$ displayed by the article 2 during its conveyance on the indexing table 7. Numeral 17 denotes a stacker for accommodating rejected articles, namely articles detected to be unacceptable in the testing of the articles on indexing table 7.

Numeral 18 designates a second indexing table for conveying articles from the first indexing table 7 in the direction of an arrow C in sets of e.g. two articles each. The second indexing table 18 is rotated at a speed which is approximately one-half that of the first indexing table 7. A third magnet 14 remotely reintroduces power to articles 2 being conveyed on the second indexing table 18. A third constant temperature water bath 19, though the invention is not limited to a water bath, applies a third predetermined temperature (48.0° C. in the present embodiment) to articles 2 being conveyed on the second indexing table 18. An acoustic detector 20 detects the sound of a buzzer (e.g. a sound which indicates an abnormally high temperature) emitted by an article during its conveyance on the indexing table 18. The acoustic detector 20 has microphones 21, 22 provided at positions facing two respective articles being conveyed on the indexing table 18. A second stacker 23 is for accommodating rejected articles detected in the testing of the articles on the indexing table 18. Numeral 24 denotes a conveyor for conveying articles 2, which have passed the aforementioned tests, in the direction of an arrow D.

FIG. 2 is a block diagram showing a control section for controlling the components of the automatic testing system depicted in FIG. 1. The control section includes a sequencer 34 the main functions of which are to rotate the indexing tables 7, 18 at their respective predetermined speeds and maintain the warm water in the constant temperature water baths 5, 16, 19 and shower 15 at the respective predetermined temperature. In accordance with command information RRLT from a CPU 33, the sequencer 34 provides the robot 4 (FIG. 1) and other mechanisms with corresponding control signals CNTR. Furthermore, the sequencer 34 receives various detection signals SENS from the indexing tables 7, 18 and other mechanisms and outputs corresponding information SSTA to the CPU 33. The information SSTA includes the aforementioned index pulse signal outputted by the detecting circuit, not shown. In accordance with the command information RRLT from the CPU 33, the sequencer 34 outputs an enable signal BCNT to the acoustic detector 20, and receives acoustic detection information BRLT from the acoustic detector 20. The information SSTA also includes the acoustic detection information BRLT. The sequencer 34 includes driver circuitry for driving the aforementioned index tables, constant temperature water baths, shower and the like, and an interface circuit for interfacing the CPU 33 with the various signals CNTR, BCNT, BRLT and SENS.

The CPU (central processing unit) 33 executes principal control of the automatic testing system according to the present embodiment. For example, in accordance with the index pulse signal inputted thereto via the sequencer 34, the CPU 33 updates the present position of each article being conveyed, tests the corresponding prescribed function whenever required, and decides whether the various functions of the articles pass or fail the tests. The first through fourth video cameras 8 through 11 of FIG. 1 are connected to a camera changeover unit (C.C.U) 31 which, in accordance with a channel selection signal CHSL from the CPU 33, selects and outputs as a video signal VIDEO any one of the signals read in from the video cameras 8 through 11. A character recognition unit 32 generates a horizontal synchronizing signal HS and a vertical synchronizing signal VS applied to the camera changeover unit 31. In accordance with a control signal RSCT from the CPU 33, and on the basis of the video signal VIDEO applied thereto, the character recognition unit 32 recognizes such information as characters, numerals, symbols and specific patterns, the lit or unlit state thereof or whether these are flashing, and provides the CPU 33 with code information CHAR indicative of the results of recognition operation. It will suffice if the character recognition unit 32 is capable of recognizing characters and the like as well as the flashing state thereof, etc., by comparing binary pattern information obtained from the video signal VIDEO with various types of internally available binary pattern information, and then making a decision based on whether or not the compared patterns coincide. As mentioned above, the acoustic detector 20 has two microphones 21, 22. Under the control of the enable signal BCNT from the sequencer 34, the acoustic detector 20 is capable of detecting whether a sound is issuing from two articles each time the indexing table 18 is indexed.

Figure 3A:
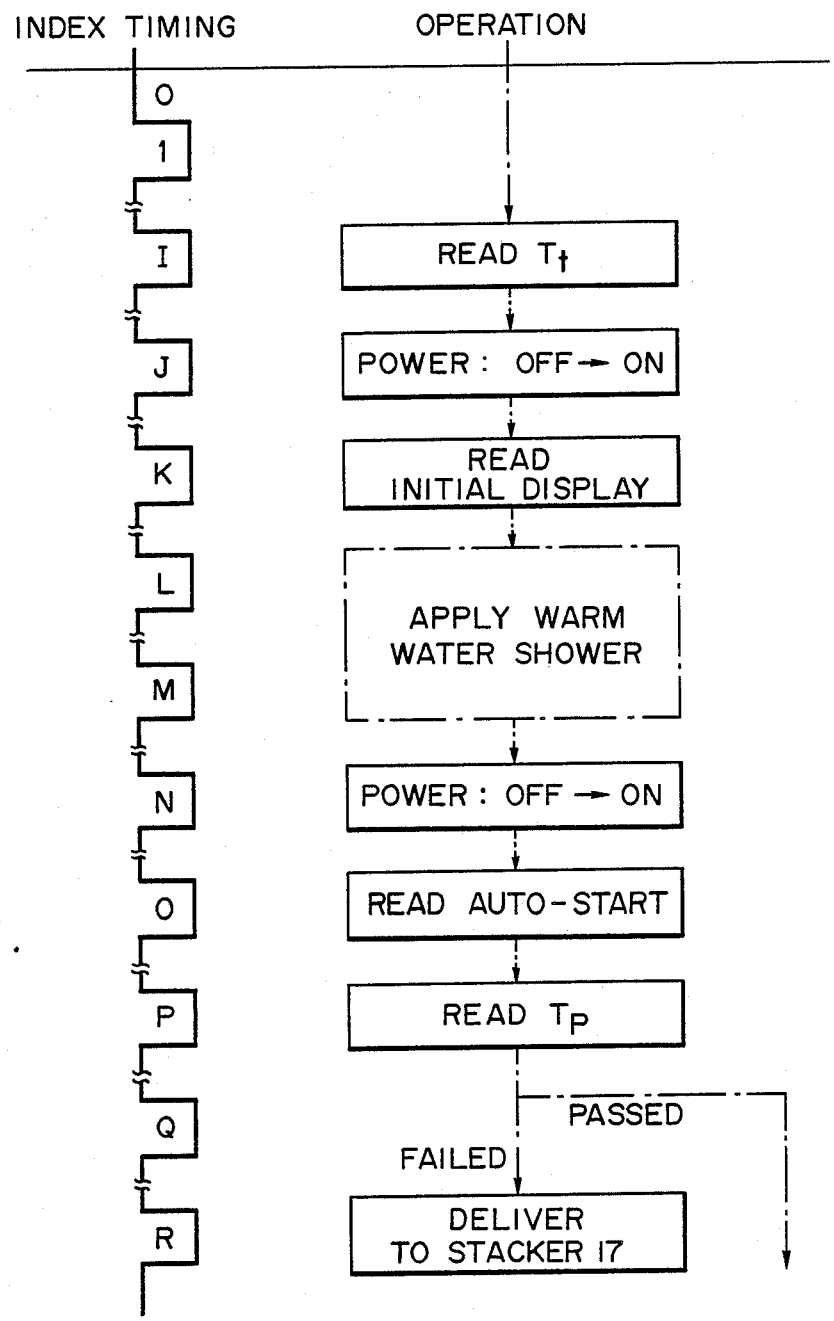
FIG. 3(A) is a timing chart for describing test steps in connection with an indexing table according to the present embodiment.

FIG. 3(A) is a timing chart for describing the testing steps associated with the indexing table 7. The robot 4 successively picks up the articles 2 from the pallet 3 and inserts them in the jig 6. The articles 2 attain thermal equilibrium one after another, within a predetermined time (8 minutes and 30 seconds in the present embodiment) per article. Each article displays its thermal equilibrium temperature $T_t$ on its own display section. Next, upon elapse of the aforementioned time period of 8 minutes and 30 seconds, the robot 4 picks up an article i from the jig 6 and places it at a predetermined position on the indexing table 7. In response, a table (testing management table) of a series of testing steps to which the article i is to be subjected is specified within the CPU 33 in correspondence with indexing timing of the kind shown in FIG. 3(A). Specifically, by way of example, the article i is merely conveyed in the direction of arrow B at timing instants 0 and 1. At a timing instant I, the article i is at a position where it passes by the video camera 8 so that its displayed equilibrium temperature value $T_t$ may be read thereby. At a timing instant J, the article i passes the vicinity of the magnet 12 and has its power supply turned off and on again by a magnetic which causes a switch within the article i to open. Thus, the internal circuitry of the article i is initialized. At a timing instant K, the article i is at a position where it passes by the front of the video camera 9, which proceeds to read the state of the initial display of the article i. At timing instants L, M, the article i has its temperature environment uniformalized with regard to each of the other articles by the warm water shower 15. The article i has power reintroduced thereto by OFF and ON of its switch at a timing instant N. Next, the article is immersed in the constant temperature water bath 16 to be warmed by the warm water to a temperature of 37° C. At a timing instant 0, the article i is at a position where it passes by the front of the video camera 10, at which time the article i displays the state which prevails at the start of temperature measurement. Accordingly, the video camera 10 reads this display at timing instant O. At a timing instant P, the article i is at a position where it passes by the front of the video camera 11, at which time the article is displaying the predicted equilibrium temperature $T_p$. Accordingly, the video camera 11 reads this display of the predicted equilibrium temperature $T_p$ at timing instant P. If any of the aforementioned functions of the article i is found to be faulty in the foregoing series of tests, the article i is received by the stacker 17 at a subsequent timing instant R. When no functions of the article i are found to be faulty, the article i is sent to the indexing table 18 at timing instant Q for the next test.

Meanwhile, an article j which follows the article i by 8 minutes and 30 seconds is placed at a predetermined position on the indexing table 7 by the robot 4. In response, a table of a series of testing steps to which the article j is to be subjected is specified within the CPU 33 in correspondence with the above-described indexing timing, and the testing steps for the article i and those for the article j proceed in parallel but at a different phase.

Figure 3B:
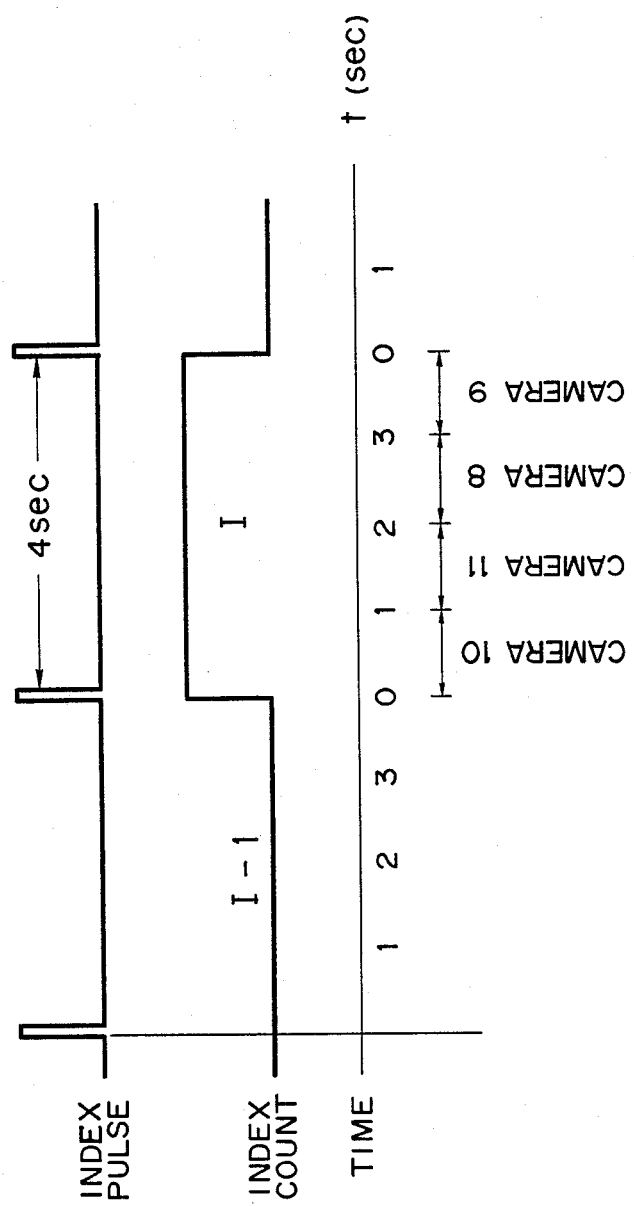
FIG. 3(B) is a timing chart showing time-sharing processing of information from various cameras in one indexing interval.

FIG. 3(B) is a timing chart showing time-sharing processing of information from the video cameras in one indexing interval (four seconds in the present embodiment). Different testing steps for a plurality of the articles are capable of being performed simultaneously in one indexing interval. Accordingly, by allotting the first through fourth seconds of each indexing interval to processing times for the information from the first through fourth cameras, as shown in FIG. 3(B), different testing steps for the plurality of articles are executed substantially simultaneously.

Though not shown, a timing chart for the testing steps associated with the indexing table 18 is similar to that shown in FIG. 3(B).

The construction and functions of an article (the predicting-type electronic clinical thermometer 2) to be tested in the present embodiment will now be described.

Figure 6A:
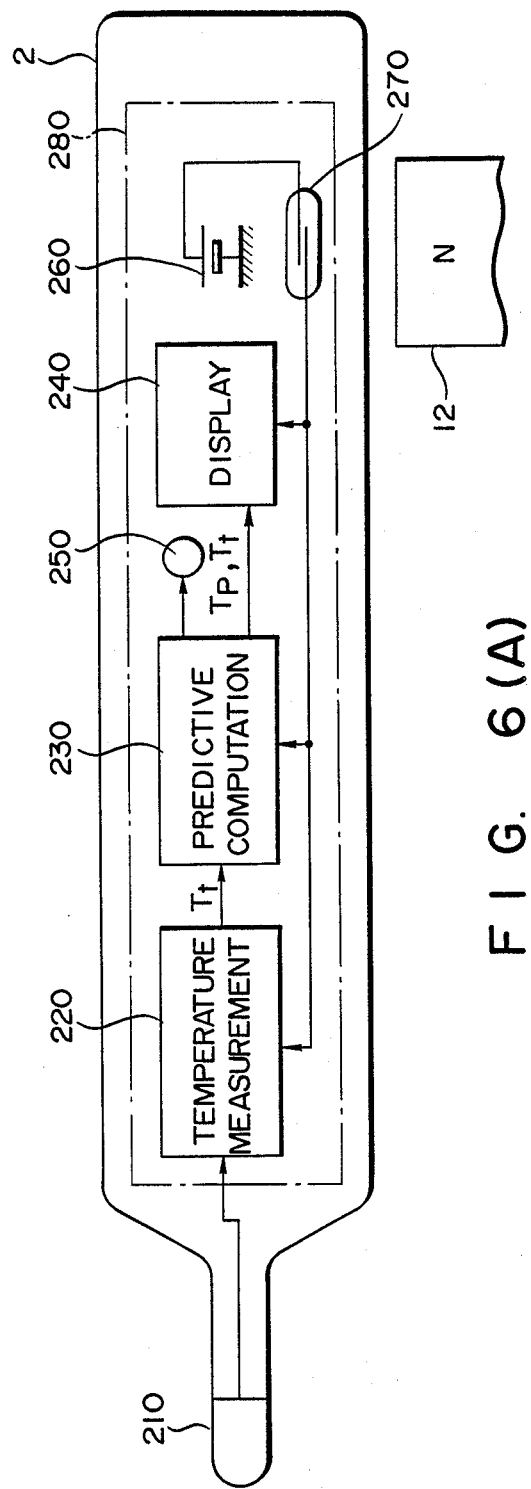
FIG. 6(A) is a block diagram illustrating the basic construction of an electronic clinical thermometer.
Figure 6B:
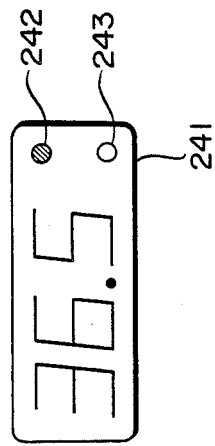
FIG. 6(B) is an external view showing the display section of the electronic clinical thermometer of FIG. 6(A)

FIG. 6(A) is a block diagram illustrating the basic construction of the electronic clinical thermometer 2, and FIG. 6(B) is a front view of the display section of the electronic clinical thermometer 2.

As shown in FIG. 6(A), the thermometer 2 includes a heat sensitive element 210 such as a thermister, and a temperature measuring unit 220 for sensing, in real-time, the temperature of a part of the body to be measured, and for generating temperature data Tt indicative of the temperature sensed. The thermometer 2 further includes a predicting arithmetic unit 230 which, from the moment a temperature measurement starts, performs a predictive computation at sampling instants to predict what the thermal equilibrium temperature will be, and outputs predicted equilibrium temperature data $T_p$, which is the result of the computations. Upon elapse of an extended period of time after the start of measurement, the arithmetic unit 230 outputs the sensed temperature data $T_t$ per se. Also provided is a display section 240 for numerically displaying the predicted equilibrium temperature data $T_p$ or sensed temperature data $T_t$ together with information that enables these two types of data to be distinguished from each other. The thermometer 2 has a buzzer 250 for generating a buzzing sound when any of the following occur, by way of example: when it is impossible for temperature to be predicted within a prescribed time because the sensed temperature data $T_t$ is erratic; when a predicted value is judged to be appropriate because the value of predicted equilibrium temperature data $T_p$ exhibits stability for a predetermined period of time; and when the value of the predicted equilibrium temperature data $T_p$ or the value of the sensed equilibrium temperature data $T_t$ exceeds a predetermined high temperature value. The thermometer 2 also includes an internal battery 260 for supplying each of the aforementioned circuits with power via a reed switch 270. The latter is actuated in response to the magnetic field from the N pole of e.g. the external magnet 12. In the absence of the pole of magnet 12, the power from the battery 260 is supplied to the aforementioned circuits. When the pole is present, or when the reed switch of the thermometer passes by the magnet, the reed switch is opened to cut off battery power from the aforementioned circuits.

As shown in FIG. 6(B), the liquid crystal display section 240 has a display panel 241 for displaying temperature data in the form of a numerical value. A mark 242 is displayed on the display panel 241 when the displayed temperature is the predicted equilibrium temperature $T_p$, and mark 243 is displayed on the display panel 241 when the displayed temperature is the sensed temperature data $T_t$. An example of an alternative method of distinguishing one displayed temperature from the other would be to cause the numerical display of the sensed temperature data $T_t$ to flash.

FIG. 7(A) is a flowchart illustrating temperature measurement processing performed within the electronic clinical thermometer 2, and FIG. 7(B) is a view showing the transition of a display readout that accompanies the temperature measurement processing of FIG. 7(A).

When power is introduced to the electronic clinical thermometer at a step S1, the display is checked at a step S2 to determine whether all segments of the liquid crystal device light. For example, the display check might entail displaying the numerical value 88.8° C., which requires that all liquid crystal segments light, as well as the marks 242, 243. A step S3 calls for a comparatively rough preliminary measurement, after which it is determined at a step S4 whether conditions are satisfied for starting a true temperature measurement. This entails determining whether the temperature sensed in the preliminary measurement exceeds e.g. 30° C., and whether the temperature rise at such time indicates a rising slope of e.g. more than 0.1° C. per second. When both of these conditions are satisfied, the sensed temperature $T_o$ (e.g. 30.0° C., along with the mark 242) prevailing at the start of measurement is displayed at a step S5, and a measurement clock is started at a step S6. Next, it is determined at a step S7 whether a long period of time [e.g. 8 minutes and 30 seconds (511 seconds) if temperature is sensed in armpit] has elapsed since the start of measurement. If this period of time has not elapsed, the program proceeds to a step S8, at which the predicted equilibrium temperature $T_p$ is obtained. This is followed by a step S9, at which it is determined whether the value of predicted equilibrium temperature $T_p$ obtained at each sampling instant has stabilized within predetermined limits. If the value has not so stabilized, the program returns to the step S7 to repeat the predictive computation. If the value has stabilized, the program proceeds to a step S10, at which the predicted equilibrium temperature $T_p$ obtained (e.g. 36.0° C., along with the mark 242) is displayed. It is then determined at a step S11 whether the predicted equilibrium temperature value is valid. The predicted value is judged to be valid when substantially equal predicted values $T_p$ (e.g. 37.0° C.) are obtained three times in succession, otherwise the value is judged to be invalid. If the predicted value is found to be invalid, the program proceeds to the step S7. When the predicted value is found to be valid, the program proceeds to a step S12, at which the buzzer 250 is sounded to inform the user of the validity of the predicted value. If the user decides to continue measurement even after the predicted value has been validated, the sensed temperature data $T_t$ itself will eventually indicate the thermal equilibrium temperature, providing the elapsed measurement time exceeds 511 seconds. At elapse of this time period, the program proceeds to a step S13, at which the sensed temperature $T_t$ (e.g. 37.0° C., along with the mark 243) is numerically displayed.

Though the processing is not shown, the buzzer 250 is sounded to indicate detection of an abnormally high temperature when the sensed temperature $T_t$ (or the predicted equilibrium temperature $T_p$) surpasses the predetermined high temperature (e.g. 43.0° C.).

FIGS. 4(A) through (D) are flowcharts for describing an embodiment of automatic testing processing in connection with the indexing table 7. The flowcharts are written in line with the flow of article i.

At the start of operation at step S21 in FIG. 4(A), the program proceeds to a step S22, at which the robot 4 extracts the article i from the article pallet 3 and inserts it in the jig 6 within the 42° C. bath. Next, at a step S23, the system waits for a time A (e.g. 8 minutes and 30 seconds) until the temperature sensitive portion of the article i attains thermal equilibrium. Upon elapse of the time A, the robot 4 extracts the article i from the 42° C. bath and places it at a predetermined position on the indexing table 7 at a step S24. When the index timing instant I finally arrives, the equilibrium temperature value $T_t$ and the associated mark displayed on the article i are read by the video camera 8 at a step S25. This is followed by a step S26, at which, on the basis of the results of the recognition operation performed on the read information by the character recognition unit 32, the CPU 33 compares the equilibrium temperature display value $T_t$ (and the associated mark) with the predetermined temperature value (42.0° C. in the present embodiment, along with the mark 243) to determine if the two agree. If they do not agree, an error flag EFLGi regarding the article i is set at a step S27 and is held in the management table of article i. If agreement is found at the step S26, the step S27 is skipped and the program proceeds to a step S31 in FIG. 4(B).

The step S31, which is executed at the index timing instant J, calls for power to be reintroduced to the article i by the magnet 12. This causes the article i to present the initial display. The video camera 9 reads the initial display at a step S32 (index timing instant K). Next, at a step S33, the initial display and predetermined data (88.8° C. and the lighting of the marks 242,243 in this embodiment) are compared by the CPU 33 at a step S33 to determine if the two agree. If they do not agree, the error flag EFLGi regarding the article i is set at a step S34 and is held in the management table of article i. If agreement is found at the step S33, the step S34 is skipped and the article i is subjected to the 35° C. warm water shower at a step S35 (index timing instants L, M). Thus, the article i is held at a fixed temperature so that the next test can begin.

Figure 4C:
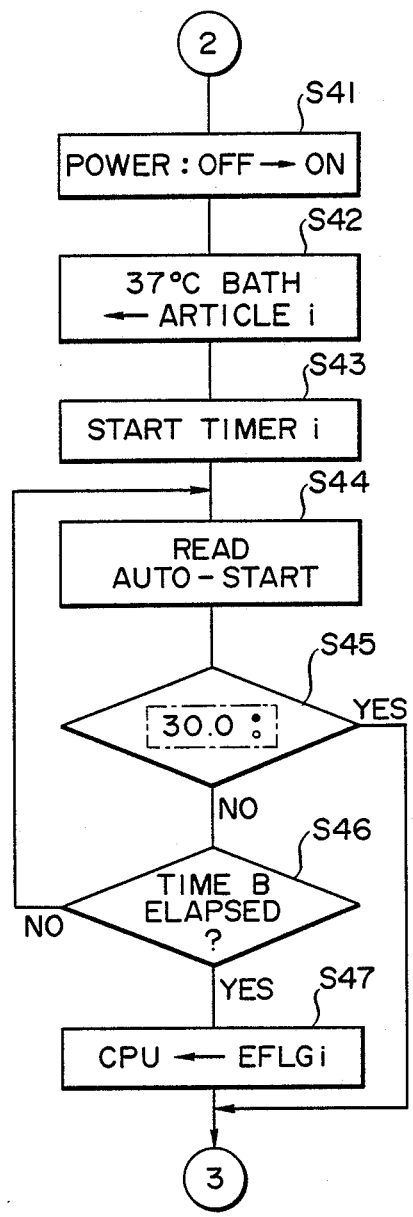

In FIG. 4(C), power is reintroduced to the article i by the magnet 13 at a step S41 (index timing instant N). In response, the article i presents the initial display. Since at least the temperature sensitive portion of the article i has been subjected to the 35° C. warm water shower at the step S35, some cooling takes place and it is assured that the temperature drop of the temperature sensitive portion from the index timing instant N is e.g. less than 30° C., and that the temperatures of the articles is approximately uniform. Next, at a step S42, the article i is immersed in the 37° C. bath by an immersing member, not shown. A timer i (not shown) for article i is started at a step S43. The display which prevails at the start of measurement is read by the video camera 10 at a step S44 (index timing instant O). Next, at a step S45, the display at the start of measurement and predetermined data (e.g. 30.0° C. and the lighting of the mark 242) are compared by the CPU 33 to determine if the two agree. (Alternatively, however, it is permissible to adopt an arrangement in which it is determined whether there is a change from the initial display state of article i to the display state at the start of measurement.) If they do not agree, it is determined at a step S46 whether a time B has run out in timer i. If time B has not run out, then the program returns to the step S44. Thus, a condition is established, namely that agreement be achieved at least by the time B has expired. When agreement is not achieved by time B, the error flag EFLGi regarding the article i is set at a step S47 and is held in the management table of article i. When agreement is achieved before time B runs out, the step 47 is skipped.

It should be noted that the timer i is used for the sake of simplifying the description. In the present embodiment, an actual timer is not used to monitor passage of the time B. For example, the time B is that required for the article i to be conveyed to the position of the video camera 10 after the article i is dipped into the 37° C. bath. The time B elapses when the article i reaches the position of the video camera 10. In actuality, therefore, the display presented by article i is read only once, and only one test is performed, when the time B elapses. In other words, control and decision processing is executed on the premise that the article i must satisfy a predetermined display state at least by the time B elapses. This method simplifies construction and control and lends itself to testing of a large number of articles. The foregoing holds hereinafter with regard to the description of timer i.

Figure 4D:
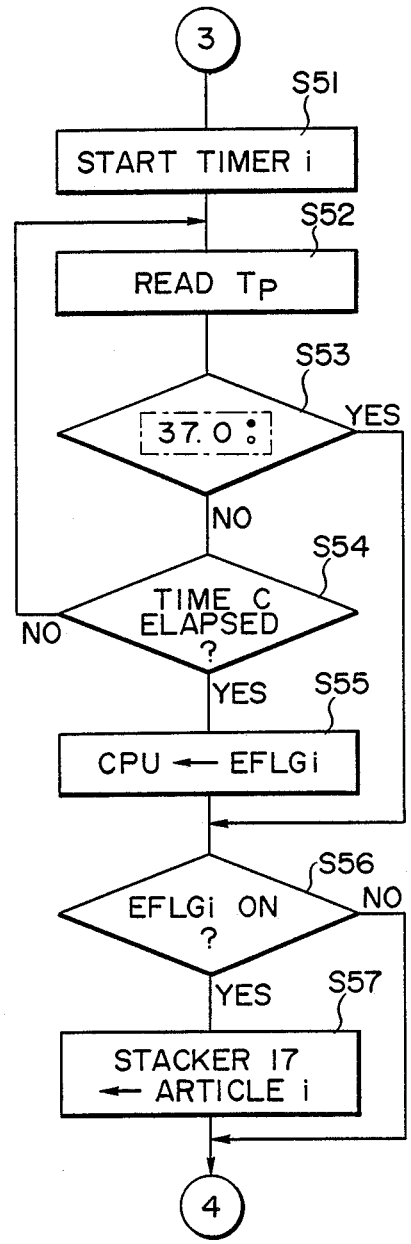

In FIG. 4(D), the timer i for article i is restarted at a step S51, and the predicted equilibrium temperature value $T_p$ is read by the camera 11 at a step S52 (index timing instant P). Next, at a step S53, the predicted equilibrium temperature value $T_p$ and predetermined data (e.g. 37.0° C. and the lighting of the mark 242) are compared by the CPU 33 to determine if the two agree. If they do not agree, it is determined at a step S54 whether a time C has run out. If time C has not run out, then the program returns to the step S52. Thus, a condition set up is that agreement be achieved at least by the time C has expired. When agreement is not achieved by time C, the error flag EFLGi regarding the article i is set at a step S55 and is held in the management table of article i. When agreement is achieved before time C runs out, the step 55 is skipped. The error flag EFLGi in the management table for article i is checked at a step S56. If the flag is ON, the article i is received in the error stacker 17 at a step S57 (index timing instant R). Otherwise, the article i is conveyed to the indexing table 18 to be subjected to the next test.

Figure 5:
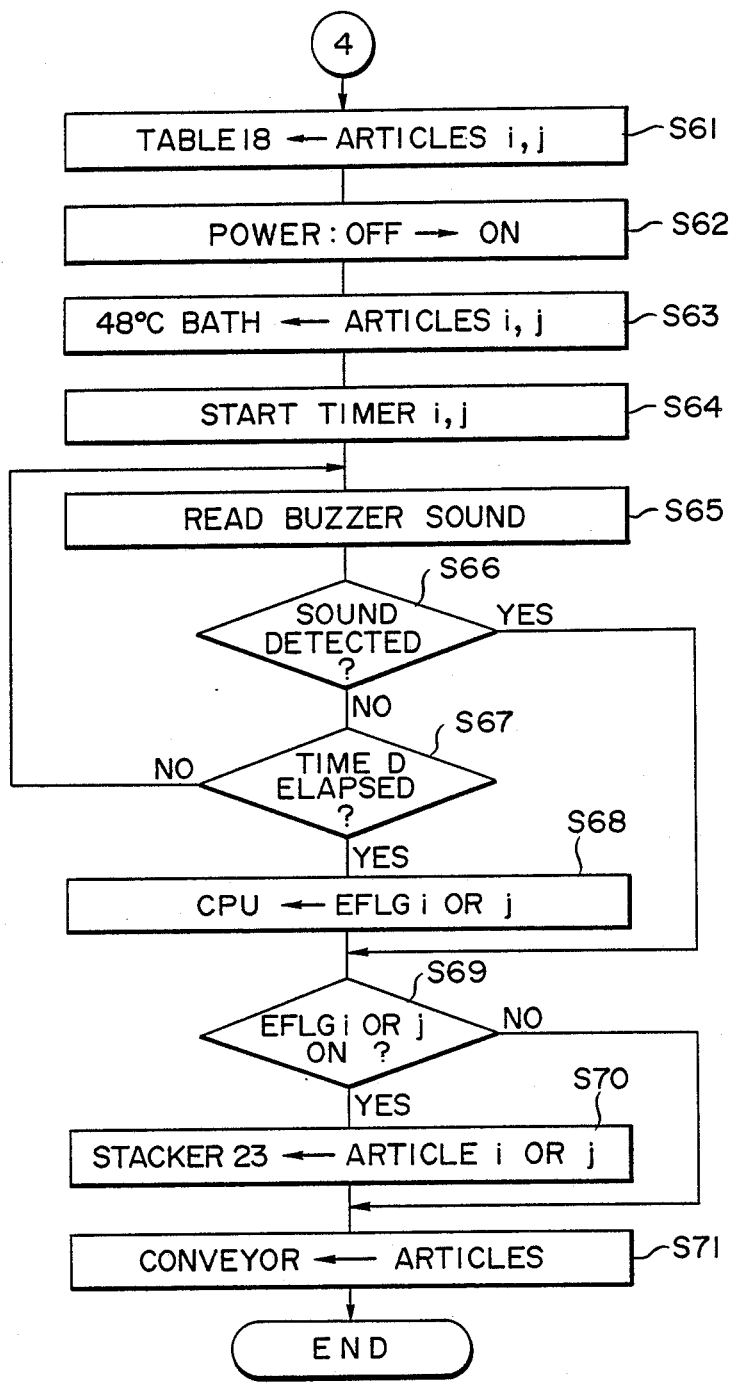
FIG. 5 is a flowchart for describing an embodiment of automatic testing processing in connection with an indexing table 18.

FIG. 5 is a flowchart for describing an embodiment of automatic testing processing in connection with the indexing table 18. The description relates to the flow of the article i.

In FIG. 5, a step S61 calls for the article i and the immediately following article j to be placed at predetermined positions on the indexing table 18. The articles i and j have power reintroduced thereto by the magnet 14 at a step S62. The articles i and j are then dipped in the 48° C. bath by the immersing member (not shown) at a step S63. The purpose of this is to test the articles i and j to determine if the user will be warned of an abnormally high temperature. This also serves as a test of the buzzer in each article. Timers i and j are started at a step S64, and the acoustic detector 20 is operated at a step S65 to detect buzzing sounds from the articles i, j by means of its microphones 21, 22, respectively. It is determined at a step S66 whether the acoustic detector 20 detects the buzzing sounds. If the decision rendered is NO, it is determined at a step S67 whether a time D has elapsed. If the answer is NO, then the program returns to the step S65. Thus, a condition set up is that the abnormally high temperature be sensed at least by the time D has expired. If the abnormally high temperature is not sensed, the error flag EFLGi for the article i or an error flag for the article j is set at a step S68 and each of these flags is held in the management tables. When the abnormally high temperature is sensed before time D runs out, the step 68 is skipped and the program proceeds to a step S69. Here the CPU 33 checks the error flags EFLGi, EFLGj for the articles i, j. If either flag is ON, the article i or j is received in the error stacker 17 at a step S70. Otherwise, the article is delivered to the conveyor 24. Thus, only articles which pass all tests are eventually obtained.

Thus, in accordance with the present invention as set forth hereinabove, a plurality of functions of a temperature measuring device are tested automatically and efficiently, without human participation, in a manner decided by the particular functions. This makes it possible to conduct all tests in-line, reduce labor, shorten testing time, improve and uniformalize testing precision and enhance testing efficiency.

As many apparently widely different embodiments of the present invention can be made without departing from the spirit and scope thereof, it is to be understood that the invention is not limited to the specific embodiments thereof except as defined in the appended claims.

What is claimed is:

1. A method of automatically testing a temperature measuring device having a plurality of functions to be tested, the temperature measuring device including a temperature responsive element, the method comprising the steps of:

heating at least the temperature responsive element of the temperature measuring device until thermal equilibrium of a predetermined temperature is attained;

testing a thermal equilibrium temperature measurement function of said temperature measuring device by reading display information from said temperature measuring device after said heating step and comparing this display information with information indicative of the predetermined temperature;

cutting off power to said temperature measuring device after said testing step and then reintroducing power to said temperature measuring device; and testing an initial display function of said temperature measuring device by reading the display information from said temperature measuring device after the reintroduction of power and comparing this display information with predetermined information.

2. A method of automatically testing a temperature measuring device having a plurality of functions to be tested, the temperature measuring device including a temperature responsive element, the method comprising the steps of:

heating at least the temperature responsive element of the temperature measuring device at a predetermined temperature;

testing an automatic measurement starting function of said temperature measuring device by reading display information from said temperature measuring device upon elapse of a first predetermined time after the start of heating; and testing a predicted equilibrium temperature measurement function of said temperature measuring device by reading display information from said temperature measuring device upon elapse of a second predetermined time after the start of heating and comparing the display information with the predetermined temperature.

3. A method of automatically testing a temperature measuring device having a plurality of functions to be tested, the temperature measuring device including a temperature responsive element, the method comprising the steps of:

heating at least the temperature responsive element of the temperature measuring device until a thermal equilibrium of a first predetermined temperature is attained;

testing a thermal equilibrium temperature measurement function of said temperature measuring device by reading display information from said temperature measuring device at said thermal equilibrium and comparing this display information with information indicative of the first predetermined temperature;

holding at least the temperature responsive element at a second predetermined temperature after said testing step;

heating the temperature responsive element to a third predetermined temperature after said holding step;

testing an automatic measurement starting function of said temperature measuring device by reading display information from said temperature measuring device upon elapse of a first predetermined time after the start of heating to said third predetermined temperature; and testing a predicted equilibrium temperature measurement function of said temperature measuring device by reading display information from said temperature measuring device upon elapse of a second predetermined time after the start of heating to said third predetermined temperature and comparing the display information with the third predetermined temperature.

4. An apparatus for automatically testing a temperature measuring device having a plurality of functions, the temperature measuring device including a temperature responsive element, the apparatus comprising:

warm bath means for applying a predetermined temperature to at least the temperature responsive element of the temperature measuring device;

optical reading means for optically reading display information from said temperature measuring device;

decision means for determining whether a function of said temperature measuring device is acceptable by comparing the display information read by said optical reading means with predetermined information; and control means for sequentially controlling one or more of said warm bath means, said optical reading means and said decision means in dependence upon a plurality of functions of said temperature measuring device that are to be tested.

5. The apparatus according to claim 4, further comprising means for remotely reintroducing power to the temperature measuring device in a testing step.

6. The apparatus according to claim 4, further comprising:

acoustic reading means for reading acoustic output information from the temperature measuring device; and decision means for determining whether the function of said temperature measuring device is acceptable by comparing the acoustic output information read by said acoustic reading means with predetermined information.

7. The apparatus according to claim 4, wherein said control means controls one or more of said warm bath means, said reading means and said decision means in dependence upon any two or more functions among an initial display function, automatic measurement starting function, predictive equilibrium temperature measurement function, thermal equilibrium temperature measurement function and acoustic alarm function of said temperature measuring device.

* * * * *